US010409998B2

(12) United States Patent
Sprenger et al.

(10) Patent No.: US 10,409,998 B2
(45) Date of Patent: *Sep. 10, 2019

(54) PROVIDING INTRUSION DETECTION, MONITORING AND PROTECTION IN A SYSTEM

(71) Applicant: Intel Corporation, Santa Clara, CA (US)

(72) Inventors: Mark E. Sprenger, Folsom, CA (US); Paul J. Gwin, Orangevale, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/977,081

(22) Filed: May 11, 2018

(65) Prior Publication Data
US 2018/0322293 A1 Nov. 8, 2018

Related U.S. Application Data

(63) Continuation of application No. 14/366,841, filed as application No. PCT/US2013/076721 on Dec. 19, 2013, now Pat. No. 9,984,237.

(51) Int. Cl.
G06F 21/60 (2013.01)
G06F 11/30 (2006.01)
(Continued)

(52) U.S. Cl.
CPC ............ G06F 21/60 (2013.01); G06F 11/30 (2013.01); G06F 21/50 (2013.01); G06F 21/55 (2013.01);
(Continued)

(58) Field of Classification Search
CPC .......... G06F 21/60; G06F 21/55; G06F 21/70; G06F 11/30; G06F 21/50; G06F 21/84; G06F 2221/032
(Continued)

(56) References Cited

U.S. PATENT DOCUMENTS 7,227,567 B1 6/2007 Beck
8,442,750 B1 5/2013 Tran
(Continued)

FOREIGN PATENT DOCUMENTS

EP 2584490 A1 4/2013

OTHER PUBLICATIONS wikipedia.org, "Micropower Impulse Radar," Jul. 1, 2013, 1 page.
(Continued)

Primary Examiner — Eric W Shepperd
Assistant Examiner — Feliciano Mejia
(74) Attorney, Agent, or Firm — Trop, Pruner & Hu, P.C.

(57) ABSTRACT

In an embodiment, a system includes a processor with at least one core to execute an application to provide intrusion detection and protection, a radar sensor to detect presence of one or more persons within a detection zone about the system and to output a detection notification responsive to the presence detection, and a peripheral controller coupled to the radar sensor to receive the detection notification and to provide the detection notification to the application, where the application is to cause a protection measure to be performed responsive to the detection notification. Other embodiments are described and claimed.

18 Claims, 10 Drawing Sheets

(51) Int. Cl.
  *G06F 21/50*   (2013.01)
  *G06F 21/70*   (2013.01)
  *G06F 21/84*   (2013.01)
  *G06F 21/55*   (2013.01)

(52) U.S. Cl.
  CPC .............. *G06F 21/70* (2013.01); *G06F 21/84* (2013.01); *G06F 2221/032* (2013.01)

(58) Field of Classification Search
  USPC .......................................................... 726/26
  See application file for complete search history.

(56) References Cited

U.S. PATENT DOCUMENTS

| | | | | |
|---|---|---|---|---|
| 8,600,110 | B1 * | 12/2013 | Chan | G06F 21/32 382/103 |
| 8,683,547 | B2 * | 3/2014 | Apparao | G06Q 10/06 705/304 |
| 8,973,149 | B2 * | 3/2015 | Buck | G06F 21/50 726/26 |
| 9,134,878 | B2 | 9/2015 | Dewan | |
| 9,143,912 | B2 | 9/2015 | Leppanen | |
| 2005/0024208 | A1 * | 2/2005 | Maki | G08B 13/122 340/545.3 |
| 2006/0056664 | A1 | 3/2006 | Iwasaki | |
| 2007/0145818 | A1 | 6/2007 | Kobayashi | |
| 2009/0273562 | A1 | 11/2009 | Baliga et al. | |
| 2010/0205667 | A1 | 8/2010 | Anderson | |
| 2010/0266162 | A1 * | 10/2010 | Singh | G06F 3/011 382/103 |
| 2011/0206285 | A1 | 8/2011 | Hodge et al. | |
| 2012/0235790 | A1 | 9/2012 | Zhao et al. | |
| 2012/0286965 | A1 * | 11/2012 | Rautiainen | H04M 1/72569 340/670 |
| 2013/0069982 | A1 | 3/2013 | Hall | |
| 2013/0347087 | A1 | 12/2013 | Smith et al. | |

OTHER PUBLICATIONS

International Searching Authority, "Notification of Transmittal of the International Search Report and the Written Opinion of the International Searching Authority," dated Sep. 26, 2014, in International application No. PCT/US2013/076721.

* cited by examiner

PROVIDING INTRUSION DETECTION, MONITORING AND PROTECTION IN A SYSTEM

This application is a continuation of U.S. patent application Ser. No. 14/366,841, filed Jun. 19, 2014, which is a § 371 national stage of international application PCT/US2013/076721, which filed Dec. 19, 2013, the content of which is hereby incorporated by reference.

TECHNICAL FIELD

Embodiments relate to security techniques to protect confidential and proprietary information of a computing system.

BACKGROUND

Viewing confidential or proprietary documents on a portable computing device such as a laptop computer or an Ultrabook™ computer in a semi-private location is not secure. Onlookers can observe displayed content from a distance. Using video conferencing in semi-private locations also can be an issue from two perspectives, as unintended onlookers may see whatever is being displayed and a camera of the device may capture undesired information, such as secure documents or whiteboard information. From a privacy standpoint, bystanders may be filmed (video captured) when they would rather not be. Such issues are a detriment to the user experience and limit a person's desire to use video conferencing or work on secure documents in semi-private environments.

DETAILED DESCRIPTION

Figure 1:
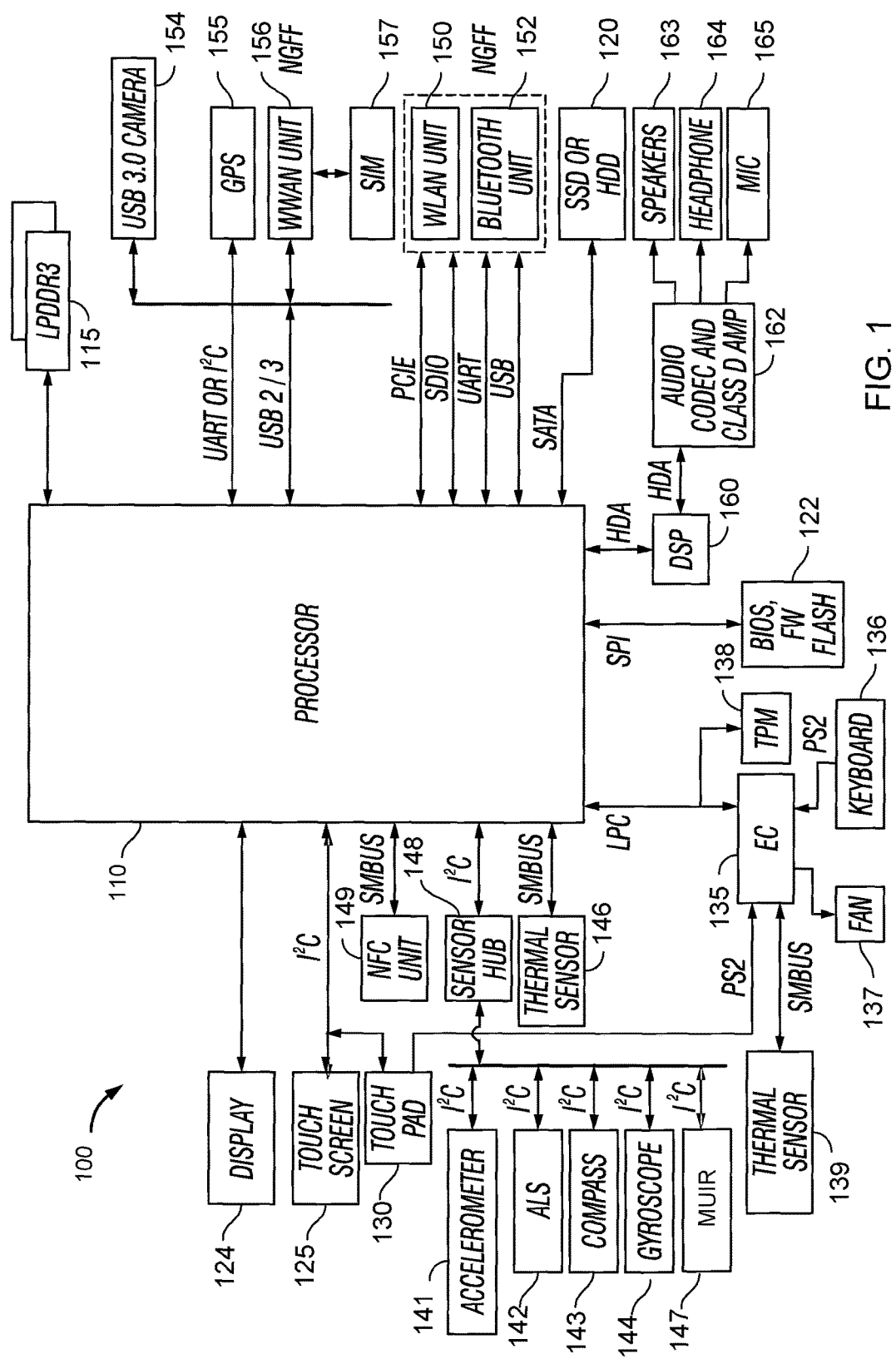
FIG. 1 is a block diagram of components present in a computer system in accordance with an embodiment of the present invention.

In various embodiments, a system may be provided with one or more hardware sensors configured to detect when a person is within a given detection zone of a system and communicate information regarding this detection to an application that provides for intrusion detection, monitoring, and protection. For example, the sensor may communicate when a person is in a location from which he or she can see a display of the system or be included in a view of one or more capture devices of the system.

Different protection techniques may be applied depending on configuration settings. Other factors may be taken into account in determining one or more appropriate protection techniques to execute. For example, a type of underlying application being executed on system may be considered, as well as the type of information being displayed on the system. Furthermore, when a user is present in a public location, it is more likely that various persons may walk through a detection zone, and thus there is less expectation of privacy and accordingly, fewer, minimal or no such protection measures may be implemented (although detection notification may occur).

In various embodiments, when a person is within a distance of a system in which the person may be in a position to view information on a display, different protection measures may be effected, including: obscuring a captured image of the detected person so that one or more remote participants in a video conference that views information obtained from a capture device of the system do not see that person; blanking the local display such that the person cannot see it (while allowing the user of the system to reposition himself); or the system may simply provide an alert or other notification such as a warning message. Understand that these and other protection measures may be performed in different combinations. For example, depending upon a distance at which a person is located from the system, first a warning message may be provided, then a blanking of the local display may occur, and finally obscuring of the detected person from a capture frame may occur during a video conference with one or more remote systems.

In order to realize intrusion detection, tracking and protection in accordance with an embodiment, a system may determine when a person is moving into the viewable area. Although the scope of the present invention is not limited in this regard, in some embodiments detection of persons may occur via use of pulsed radio frequency radar techniques. For example, in an embodiment a system may include send and receive antennae and implement a method of triangulation to determine the location of people relative to the system. In one such embodiment, this technique may use one or more micropower ultrawideband impulse radar (MUIR) sensors. To avoid false positives for one or more authorized users of the system, the system may comprehend authorized users and not initiate a security response based on such users' presence. This can be accomplished using any embedded or peripheral device capable of location and tracking such as a MUIR sensor or similar system.

Embodiments thus use hardware, software, firmware, and combinations thereof to enact a security protocol set by the user when a person is detected in a location that would enable them to see the display or be seen by the camera. Still further, embodiments may detect and anticipate the position of moving objects relative to the display.

Referring now to FIG. 1, a block diagram of components present in a computer system in accordance with an embodiment of the present invention. As shown in FIG. 1, system 100 may include any combination of components. These components may be implemented as ICs, portions thereof, discrete electronic devices, or other modules, logic, hardware, software, firmware, or a combination thereof adapted in a computer system, or as components otherwise incorporated within a chassis of the computer system. Note also that the block diagram of FIG. 1 is intended to show a high level view of many components of the computer system. However, it is to be understood that some of the components shown may be omitted, additional components may be present, and different arrangement of the components shown may occur in other implementations.

As seen in FIG. 1, a processor 110, in one embodiment, includes a microprocessor, multi-core processor, multi-threaded processor, an ultra low voltage processor, an embedded processor, or other known processing element. In the illustrated implementation, processor 110 acts as a main processing unit and central hub for communication with many of the various components of the system 100. As one example, processor 100 is implemented as a system on chip (SoC). As a specific illustrative example, processor 110 may be an Intel® Architecture Core™-based processor such as an i3, i5, i7 or another such processor available from Intel Corporation, Santa Clara, Calif. However, other low power processors such as available from Advanced Micro Devices, Inc. (AMD) of Sunnyvale, Calif., an ARM-based design from ARM Holdings, Ltd. or customer thereof or a MIPS-based design from MIPS Technologies, Inc. of Sunnyvale, Calif., or their licensees or adopters may instead be present in other embodiments such as an Apple A5 processor, a Qualcomm Snapdragon processor, or TI OMAP processor. Certain details regarding the architecture and operation of processor 110 in one implementation will be discussed further below.

As a SoC, processor 110 may include a CPU portion including one or more cores and other related circuitry including uncore circuitry. A peripheral controller may also be integrated on the same semiconductor die and which acts as a central hub and interface to various peripheral devices coupled to processor 110. As described further below, information communicated from a radar sensor in accordance with an embodiment of the present invention may couple through peripheral controller of processor 110 to an intrusion detection application executing on one or more cores of the processor. Understand that in other embodiments, the peripheral controller may be implemented as a standalone integrated circuit to which the radar sensor couples.

Processor 110, in one embodiment, communicates with a system memory 115. As an illustrative example, the system memory 115 is implemented via multiple memory devices or modules to provide for a given amount of system memory. In one embodiment, the memory is operable in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 or LPDDR4 that will offer extensions to LPDDR2 to increase bandwidth. As examples, 2/4/8/12/16 gigabytes (GB) of system memory may be present and can be coupled to processor 110 via one or more memory interconnects. In various implementations the individual memory devices may be of different package types such as single die package (SDP), dual die package (DDP) or quad die package (QDP). These devices, in some embodiments, are directly soldered onto a motherboard to provide a lower profile solution, while in other embodiments the devices are configured as one or more memory modules that in turn couple to the motherboard by a given connector.

To provide for persistent storage of information such as data, applications, one or more operating systems and so forth, a mass storage 120 may also couple to processor 110. In various embodiments, to enable a thinner and lighter system design as well as to improve system responsiveness, this mass storage may be implemented via a solid state drive (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 1, a flash device 122 may be coupled to processor 110, e.g., via a serial peripheral interface (SPI). This flash device may provide for non-volatile storage of system software, including a basic input/output software (BIOS) as well as other firmware of the system. In various embodiments, mass storage of the system is implemented by a SSD alone or as a disk, optical or other drive with an SSD cache.

Various input/output (IO) devices may be present within system 100. Specifically shown in the embodiment of FIG. 1 is a display 124 which may be a high definition LCD or LED panel configured within a lid portion of the chassis. This display panel may also provide for a touch screen 125, e.g., adapted externally over the display panel such that via a user's interaction with this touch screen, user inputs can be provided to the system to enable desired operations, e.g., with regard to the display of information, accessing of information and so forth. In one embodiment, display 124 may be coupled to processor 110 via a display interconnect that can be implemented as a high performance graphics interconnect. Touch screen 125 may be coupled to processor 110 via another interconnect, which in an embodiment can be an I$^2$C interconnect. As further shown in FIG. 1, in addition to touch screen 125, user input by way of touch can also occur via a touch pad 130 which may be configured within the chassis and may also be coupled to the same I$^2$C interconnect as touch screen 125.

For perceptual computing and other purposes, various sensors may be present within the system and may be coupled to processor 110 in different manners. Certain inertial and environmental sensors may couple to processor 110 through a sensor hub 148, e.g., via an I$^2$C interconnect. In the embodiment shown in FIG. 1, these sensors may include an accelerometer 141, an ambient light sensor (ALS) 142, a compass 143 and a gyroscope 144. Other environmental sensors may include one or more thermal sensors 146 which in some embodiments couple to processor 110 via a system management bus (SMBus) bus. As further seen, one or more MUIRs 147 may further couple to sensor hub 148. Using one or more MUIRs 147, information regarding potential intruders within a detection zone of system 100 may be obtained and provided to an intrusion detection application as described herein.

Using the various inertial and environmental sensors present in a platform, many different use cases may be realized. These use cases enable advanced computing operations including perceptual computing and also allow for enhancements with regard to power management/battery life, security, and system responsiveness.

Also seen in FIG. 1, various peripheral devices may couple to processor 110 via a low pin count (LPC) interconnect. In the embodiment shown, various components can be coupled through an embedded controller (EC) 135. Such components can include a keyboard 136 (e.g., coupled via a PS2 interface), a fan 137, and a thermal sensor 139. In some embodiments, touch pad 130 may also couple to EC 135 via a PS2 interface. In addition, a security processor such as a trusted platform module (TPM) 138 in accordance with the Trusted Computing Group (TCG) TPM Specification Version 1.2, dated Oct. 2, 2003, may also couple to processor 110 via this LPC interconnect. However, the scope of the present invention is not limited in this regard and secure processing and storage of secure information may be in another protected location such as a static random access memory (SRAM) in a security coprocessor, or as encrypted data blobs that are only decrypted when protected by a secure enclave (SE) processor mode. In various embodiments EC 135 may communicate power envelope parameters to power control logic in processor 110 to enable configurable and dynamic constraints on power consumption.

System 100 can communicate with external devices in a variety of manners, including wirelessly. In the embodiment shown in FIG. 1, various wireless modules, each of which can correspond to a radio configured for a particular wireless communication protocol, are present. One manner for wireless communication in a short range such as a near field may be via a near field communication (NFC) unit 145 which may communicate, in one embodiment with processor 110 via an SMBus. Note that via this NFC unit 149, devices in close proximity to each other can communicate. For example, a user can enable system 100 to communicate with another (e.g.,) portable device such as a smartphone of the user via adapting the two devices together in close relation and enabling transfer of information such as identification information payment information, data such as image data or so forth. Wireless power transfer may also be performed using a NFC system.

Using the NFC unit described herein, users can bump devices side-to-side and place devices side-by-side for near field coupling functions (such as near field communication and wireless power transfer (WPT)) by leveraging the coupling between coils of one or more of such devices. More specifically, embodiments provide devices with strategically shaped, and placed, ferrite materials, to provide for better coupling of the coils. Each coil has an inductance associated with it, which can be chosen in conjunction with the resistive, capacitive, and other features of the system to enable a common resonant frequency for the system.

As further seen in FIG. 1, additional wireless units can include other short range wireless engines including a WLAN unit 150 and a Bluetooth unit 152. Using WLAN unit 150, Wi-Fi™ communications in accordance with a given Institute of Electrical and Electronics Engineers (IEEE) 802.11 standard can be realized, while via Bluetooth unit 152, short range communications via a Bluetooth protocol can occur. These units may communicate with processor 110 via, e.g., a USB link or a universal asynchronous receiver transmitter (UART) link. Or these units may couple to processor 110 via an interconnect according to a Peripheral Component Interconnect Express™ (PCIe™) protocol, e.g., in accordance with the PCI Express™ Specification Base Specification version 3.0 (published Jan. 17, 2007), or another such protocol such as a serial data input/output (SDIO) standard. Of course, the actual physical connection between these peripheral devices, which may be configured on one or more add-in cards, can be by way of the NGFF connectors adapted to a motherboard.

In addition, wireless wide area communications, e.g., according to a cellular or other wireless wide area protocol, can occur via a WWAN unit 156 which in turn may couple to a subscriber identity module (SIM) 157. In addition, to enable receipt and use of location information, a GPS module 155 may also be present. Note that in the embodiment shown in FIG. 1, WWAN unit 156 and an integrated capture device such as a camera module 154 may communicate via a given USB protocol such as a USB 2.0 or 3.0 link, or a UART or I²C protocol. Again the actual physical connection of these units can be via adaptation of a NGFF add-in card to an NGFF connector configured on the motherboard.

Camera module 154 may be an integrated camera can be incorporated in the lid. As one example, this camera can be a high resolution camera, e.g., having a resolution of at least 2.0 megapixels (MP) and extending to 6.0 MP and beyond.

To provide for audio inputs and outputs, an audio processor can be implemented via a digital signal processor (DSP) 160, which may couple to processor 110 via a high definition audio (HDA) link. Similarly, DSP 160 may communicate with an integrated coder/decoder (CODEC) and amplifier 162 that in turn may couple to output speakers 163 which may be implemented within the chassis. Similarly, amplifier and CODEC 162 can be coupled to receive audio inputs from a microphone 165 which in an embodiment can be implemented via dual array microphones (such as a digital microphone array) to provide for high quality audio inputs to enable voice-activated control of various operations within the system. Note also that audio outputs can be provided from amplifier/CODEC 162 to a headphone jack 164.

Figure 2:
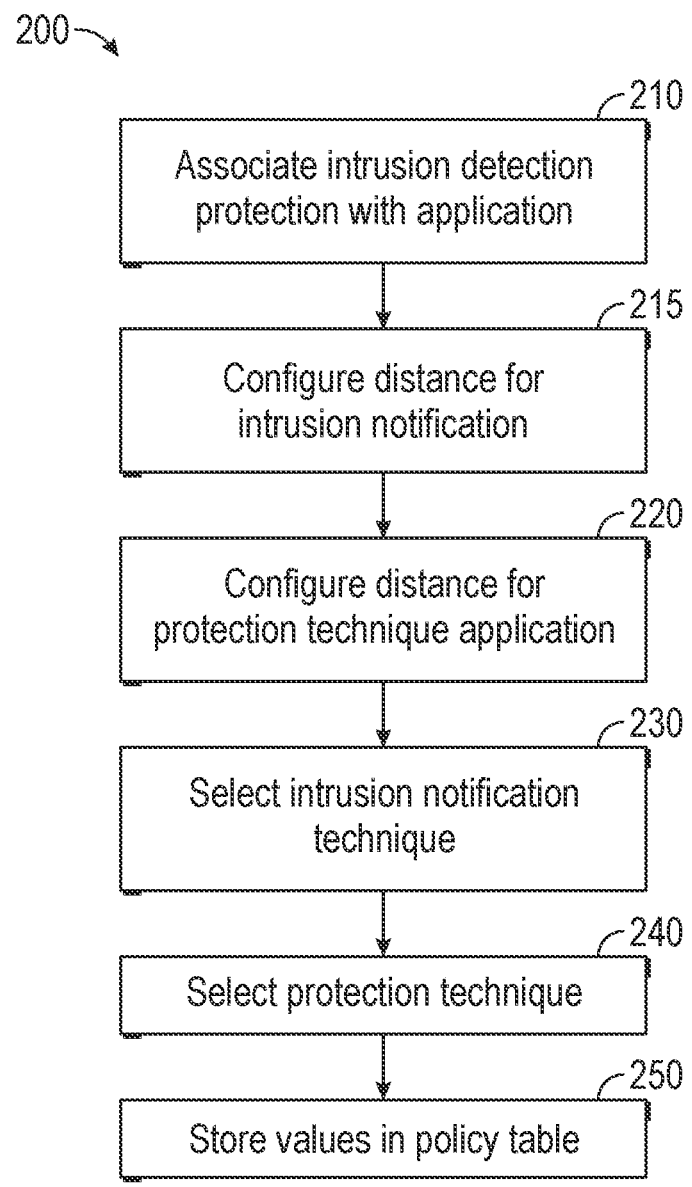
FIG. 2 is a flow diagram of a method for configuring an intrusion detection and protection application in accordance with an embodiment.

In some embodiments, processor 110 may be powered by an external voltage regulator (VR) and multiple internal voltage regulators that are integrated inside the processor die, referred to as fully integrated voltage regulators (FIVRs). The use of multiple FIVRs in the processor enables the grouping of components into separate power planes, such that power is regulated and supplied by the FIVR to only those components in the group. During power management, a given power plane of one FIVR may be powered down or off when the processor is placed into a certain low power state, while another power plane of another FIVR remains active, or fully powered. Although shown with these particular components in the embodiment of FIG. 1, understand the scope of the present invention is not limited in this regard Referring now to FIG. 2, shown is a flow diagram of a method for configuring an intrusion detection and protection application in accordance with an embodiment. As shown in FIG. 2, method 200 may be performed by a configuration module of the application, which may be entered responsive to a user request during configuration of the application on a given system, or any time that a user desires to change any of the configuration settings. Note that as used herein, this application may be referred to equally as an "intrusion protection application", "intrusion monitoring application", "intrusion detection application", or generally as an "intrusion application" in that in some implementations, the application may only be configured for detection and/or monitoring, but not protection.

As seen, method 200 begins by associating an intrusion protection with a given application (block 210). That is, the intrusion detection application itself may be associated with one or more other applications that execute on the system to provide appropriate intrusion protection based on the type of underlying application being executed on system. Note that method 200 may be performed, e.g., serially, for each application for which intrusion protection is desired. The selection of an appropriate application may be under user control, where a user selects one or more applications from a menu of available applications.

Assume for purposes of discussion that a given application to be associated with the intrusion detection application is a video conferencing application that executes on the system to enable the user to engage in video conferencing activities with one or more remote parties associated with corresponding remote systems. In general, this video conferencing application is configured to enable the user to communicate audiovisual and other information to and from one or more remote systems. Furthermore, with the intrusion detection and protection measures made available by an application in accordance with an embodiment, certain greenscreen or other background displays may be presented to the remote end, e.g., to obscure identity of the user's location (or at least portions of the background scene when an intruder is detected).

With reference still to FIG. 2, control passes to block 215 where a distance for intrusion notification may be configured. Note that the intrusion detection made available using embodiments may be via a type of radar or other sensor that can provide for detection in proximity to the system, e.g., between approximately 50-100 feet. Accordingly, the user can configure the application to select an appropriate distance at which an intrusion detection notification is to be made. In some embodiments, there may be multiple detection zones and corresponding notifications and or protection measures to be taken. Next, at block 220 a distance for protection technique application may be configured. As will be discussed further, in certain embodiments upon initial detection of a person within a peripheral detection zone, a notification may be made and then when a person enters a closer detection zone, a given protection technique may be applied. Thus the configuration module enables the user to select appropriate distances for these 2 detection zones. Understand however that in other embodiments, more than 2 such detection zones may be configured.

Still referring to FIG. 2, next at block 230 an intrusion notification technique may be selected. Although the scope of the present invention is not limited in this regard in different implementations available techniques include a warning message to be displayed on a display of the system, an audible warning, or another type of notification. Next, the configuration module may receive a selection of an appropriate protection technique (block 240). In one such embodiment, the user may select a single protection technique, such as blanking out a local display, preventing communication of visual information to a remote system, obscuring of visual display of the intruder, among other such techniques. For example, visual information may be replaced with other information, obscuring the information with an image or background. Finally, the various configuration values discussed above may be stored in a policy table (block 250). This policy table may be stored in a working memory (such as a dynamic random access memory or other memory storage) during execution of the application, and may further be stored in a non-volatile storage such as a flash memory, hard drive or other such non-volatile storage. Although shown at this high level in the embodiment of FIG. 2, understand the scope of the present invention is not limited in this regard.

In an embodiment using MUIR, detection may occur in a given area around the system. For example, some implementations of an MUIR sensor are capable of detecting movement up to 100 feet and tracking movement to anticipate movements into the viewable area of the display. Still further, such sensors can look forward and backward to detect movement and anticipate the approach of persons relative to the display. By using an MUIR or other such sensor, detection may occur at a distance much farther than depth sensing optical devices so that encroachment can be anticipated.

Based on the detection information, real time localized obscuring (such as blurring) of captured image data may occur based on location data sent from the sensor system. Still further, embodiments may be used to blank or dim the user display when a person moves into a location in which he or she is capable of seeing the display. Embodiments may be used to enable privacy of on-display information and unintended filming of people in the background. Still further, a detection and tracking security protocol in accordance with an embodiment can be used by application developers to improve user experience.

Embodiments also may be used in connection with optical technology to check for eye gazing, and blank the display if an eye gaze of an intruder towards the system is detected. Still further using such optical technology, embodiments may blank the display when the user looks away or attention is drawn away from the display for added protection.

Figure 3:
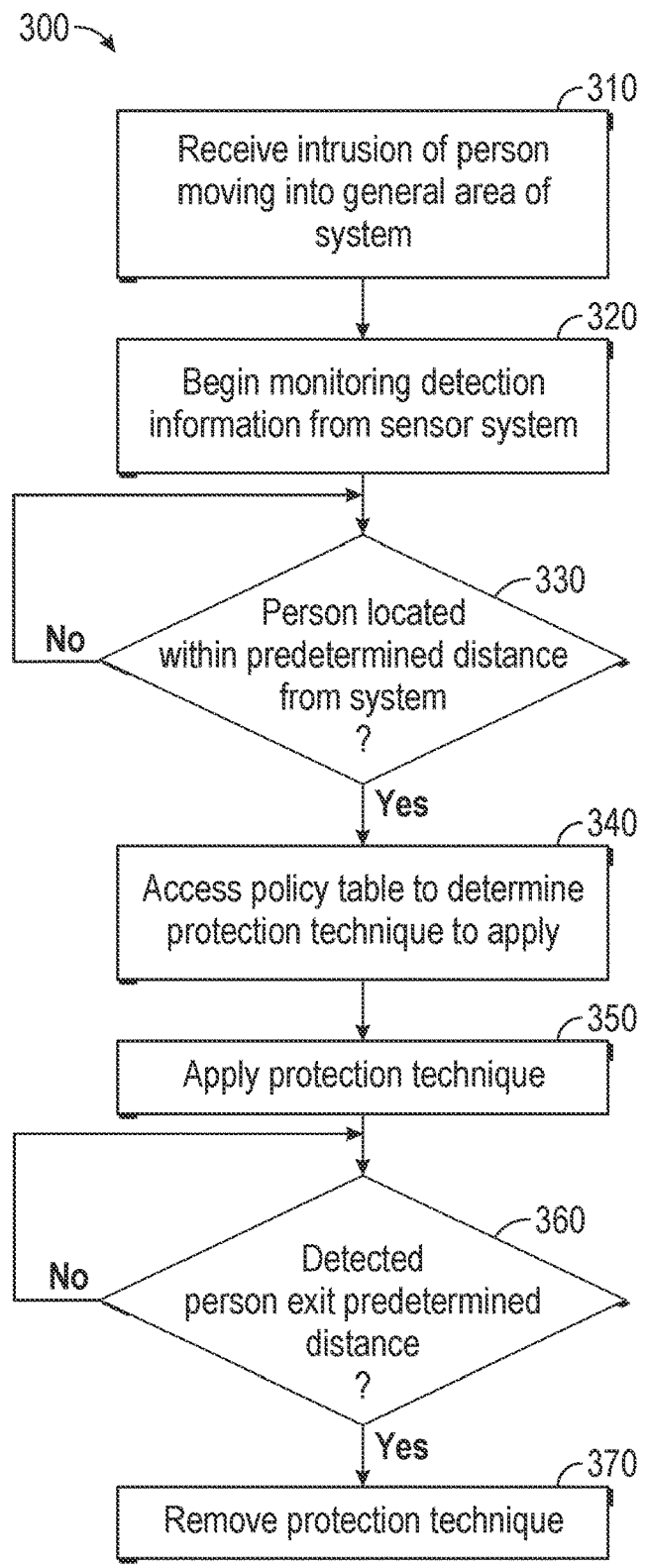
FIG. 3 is a flow diagram of a method for intrusion detection and protection in accordance with an embodiment.

Referring now to FIG. 3, shown is a flow diagram of a method for intrusion detection and protection in accordance with an embodiment. As shown in FIG. 3, method 300 may be performed when an intrusion protection application is executed. In various embodiments, the intrusion detection and protection application may leverage various features of a system, including a radar detection sensor such as a micropower ultrawideband impulse radar sensor. Of course understand that other sensors may also be used to provide some amount of intrusion detection. Furthermore, a capture device such as a video capture device may also be leveraged by the application.

This application may execute on one or more cores of a multicore processor in a system having such a multicore processor. Of course understand that the application may execute similarly on a single core processor.

As seen, method 300 begins by receiving an indication of a person moving into the general area of a system (block 310). Note that this general area may correspond to a first configured detection zone, e.g., a peripheral detection zone, as configured by the user. In an embodiment, the application receives the indication indirectly from the sensor, e.g., via a sensor hub to which the sensor is coupled, in turn to a peripheral controller and then to the application itself.

Responsive to this indication, detection information may begin to be monitored from the sensor system (block 320). Here, the application may receive detection information to track the person within this general system area. Then control passes to diamond 330 where it can be determined whether the person is located within a predetermined distance from the system. In an embodiment, this predetermined distance may correspond to a second or proximal detection zone, which is the trigger used to begin protection measures. Such measures include notifying the user regarding the potential intrusion as well as initiating protection measures. Note that in a given implementation, multiple detection zones may be provided such that after an indication to the application that a person has entered into a general area of the system, a notification or warning is provided to the user. Then when the person comes within the proximal detection zone (e.g., the predetermined distance as determined by diamond 330), an appropriate protection technique can be performed.

Thus in this embodiment control passes to block 340 where the policy table may be accessed to determine the appropriate protection technique to apply. In an embodiment, this policy table may be present in a system memory while the application is executing. Then at block 350, based at least in part on the information within the policy table, the appropriate detection technique may be applied. Note that combinations of different protection techniques may be performed in some implementations, e.g., as configured by a user. Furthermore, it is possible to enable the user to provide an input to select one of multiple appropriate protection techniques, e.g., based on a location of the system or the possible intruder. Next, control passes to diamond 360 where it can be determined whether the detected person has exited from the predetermined distance. If not, the protection technique may continue to be applied and at some regular or irregular interval, the determination at diamond 360 may occur. When it is determined that the person has exited from the predetermined distance, control passes to block 370 where the appropriate protection technique may be removed. Although shown as a termination of a method in FIG. 3, understand that when a protection technique is removed, the application may continue to execute, e.g., via a loop back to block 310 for receipt of another indication of a person moving into the general system area. Further although a particular method 300 regarding an intrusion detection and protection application execution is shown, understand that variations are possible.

For example, while the above described method is discussed in connection with detection of a single person, understand that embodiments may equally be used to detect and track one or more persons moving into the detection zone. Furthermore, while the initial detection of individual proceeds under the assumption that the individuals are not authorized, embodiments further enable determination as to presence of authorized users or individuals such that when authorized individuals are detected within one or more detection zones, selected protection techniques are not applied.

Furthermore, embodiments can be used to enable a user to indicate whether a detected person is authorized or not. For example, an image of a detected person may be displayed on a display of the system to enable the user to identify the person as an authorized or unauthorized individual. Only if the detected person is indicated to be an unauthorized individual is a protection technique initiated. Furthermore, understand that when one or more authorized persons enter into the detection zones, the application may track such individuals so that they do not trigger any of the security protocols as described herein.

Figure 4:
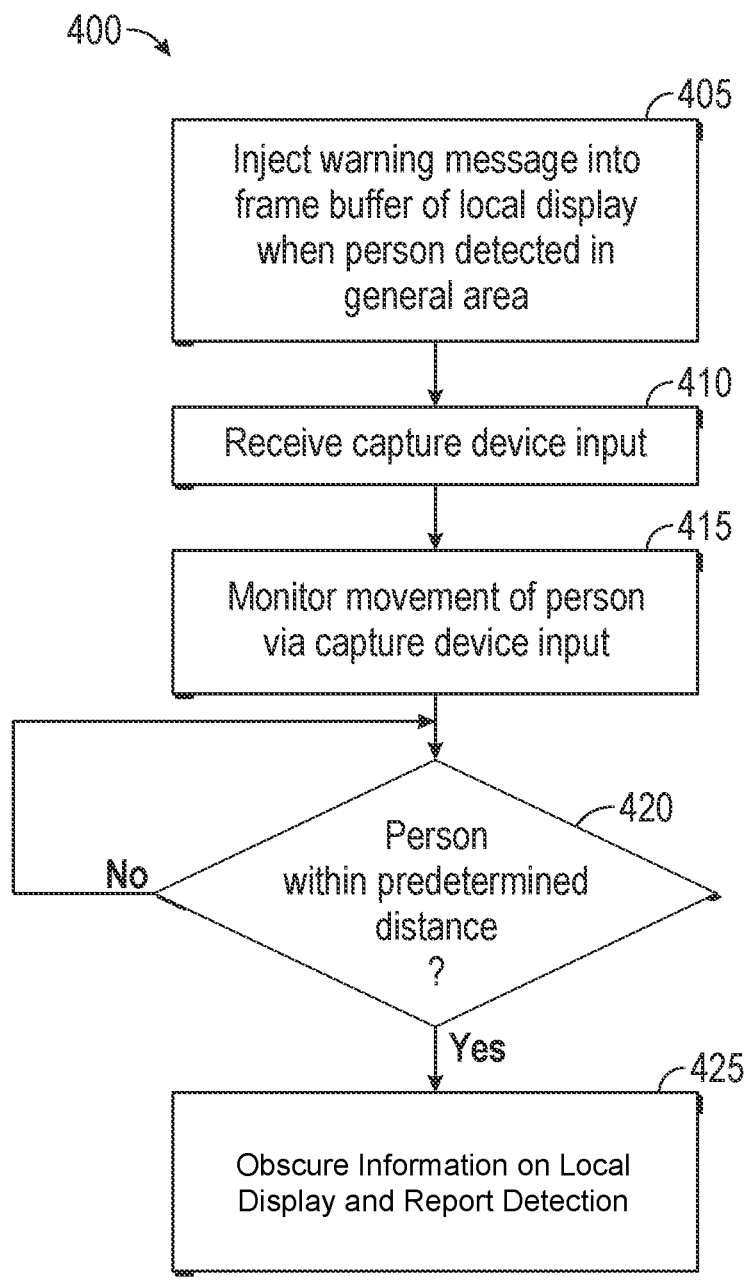
FIG. 4 is a flow diagram of a method for performing a protection technique in accordance with an embodiment of the present invention.

With reference now to FIG. 4, shown is a flow diagram of a method for performing a protection technique in accordance with an embodiment of the present invention. Method 400 shown in FIG. 4 may be performed by the intrusion protection application during execution when an intruder is identified by the sensor system. More specifically, FIG. 4 shows that method 400 begins by injecting a warning message into a frame buffer of a local display when a person is detected within a general area of the system (block 405). In an embodiment, this warning message may be placed in a predetermined location of the local display, e.g., as part of a toolbar or at another location. Alternately, the warning message may be displayed prominently on the user's display. In general, this warning message may be displayed when a person is detected within one of the detection zones, e.g., the peripheral detection zone. By this warning message, the user may choose to take one or more appropriate actions with regard to the system, e.g., turning off the system or removing from the display any confidential information.

Still referring to FIG. 4, next a capture device input may be received by the application (block 410). In an embodiment, the capture device is a video camera that is used to provide a video image of the area in which the system is located, e.g., a camera located on a bezel portion of the display or one or more peripheral cameras. Using the information received from this capture device, movement of the person may be monitored by the application (block 415). In addition, an indication of the direction of the person's movement, among other such information determined based on information obtained from the sensor and this capture device information may be provided to the user, e.g., a direction at which the person is coming towards the system (forward, backward, left, right), approximate speed, distance and so forth.

Next it may be determined whether the person is within a predetermined distance of the system (diamond 420). In an embodiment, this predetermined distance may correspond to another detection zone, e.g., a proximal detection zone.

At block 425 if it is determined that the person is within this predetermined distance, certain information on the local display may be obscured. For example, the application may cause the obscuring of confidential information such as proprietary information of an employee's corporation, a user's financial information or other such information (such as remote video of an ongoing video conference). Different forms of the obscuration, including pixellation, blanking or other obscuration may be used. In addition to obscuring this information, the application may also report detection of the intruder. Various information and manners of providing this report can be used in different embodiments.

Figure 5:
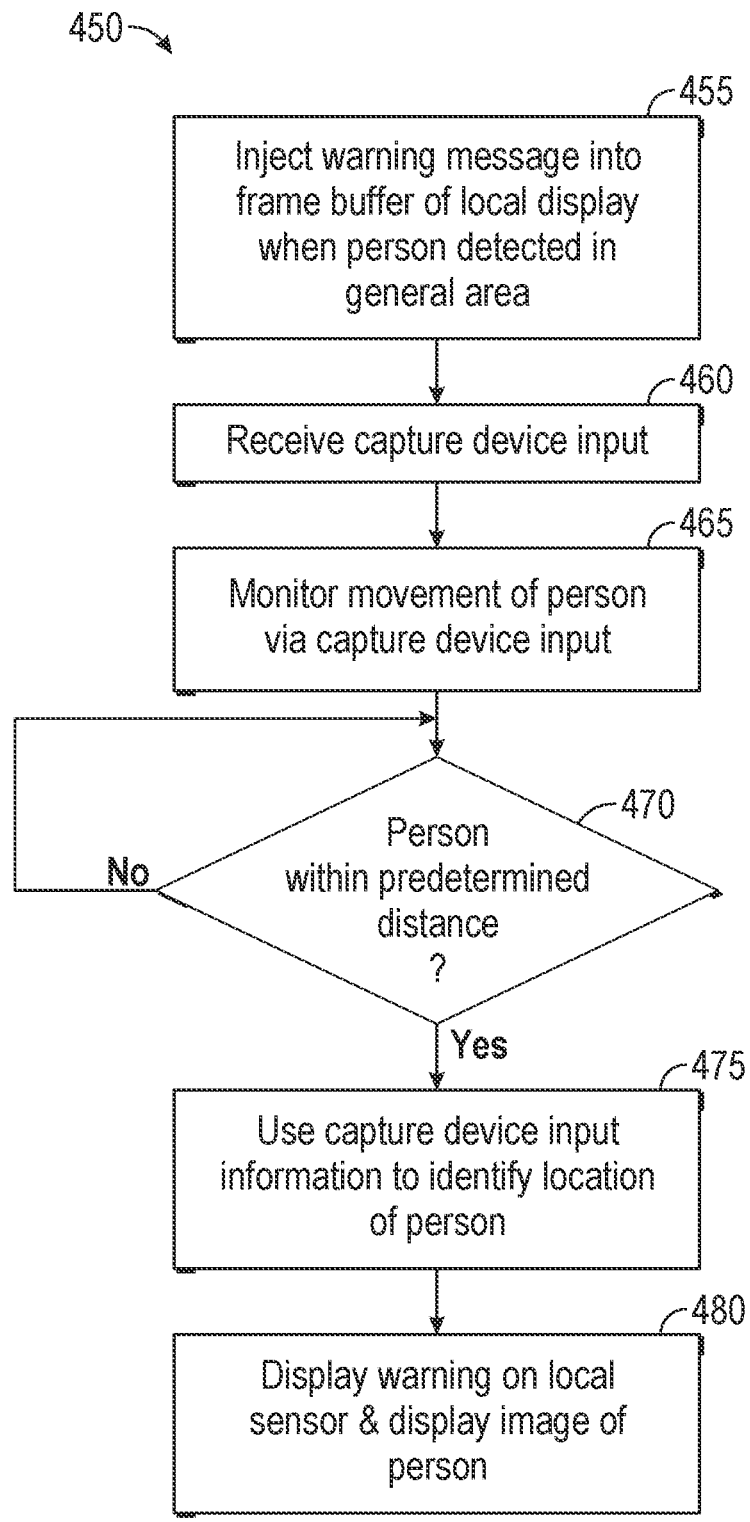
FIG. 5 is a flow diagram of a method for performing a protection technique in accordance with another embodiment of the present invention.

Understand that other forms of intrusion protection can be realized. With reference now to FIG. 5, shown is a flow diagram of a method for performing a protection technique in accordance with another embodiment of the present invention. Method 450 shown in FIG. 5 may be another type of protection technique to be performed by the intrusion protection application during execution when an intruder is identified by the sensor system. More specifically, FIG. 5 shows that method 450 begins by injecting a warning message into a frame buffer of a local display when a person is detected within the general system area (block 455). This warning message may be as discussed above.

Still with reference to FIG. 5, next a capture device input may be received by the application (block 460). Using the information received from this capture device, the application may monitor movement of the person (block 465). This movement may include an indication of the direction of the person's movement, and other information, as discussed above.

Next it may be determined whether the person is within a predetermined distance of the system, e.g., a proximal detection zone (diamond 470). If so, at block 475 capture device information may be used to identify the location of the person within the image obtained by the capture device. Then another warning may be displayed on the local display (block 480). More specifically, this display warning may further include an image of the person, e.g., within the scene captured by the image capture device. To more particularly point out the person, a general outline of the person in the image may be highlighted to enable the user to more readily ascertain the identity and location of this person. Although shown with this particular type of protection technique in the embodiment of FIG. 5, understand the scope of the present invention is not limited in this regard, and various other protection techniques may be used separately or in combination with these display warnings and tracking using information from an input capture device.

Figure 6:
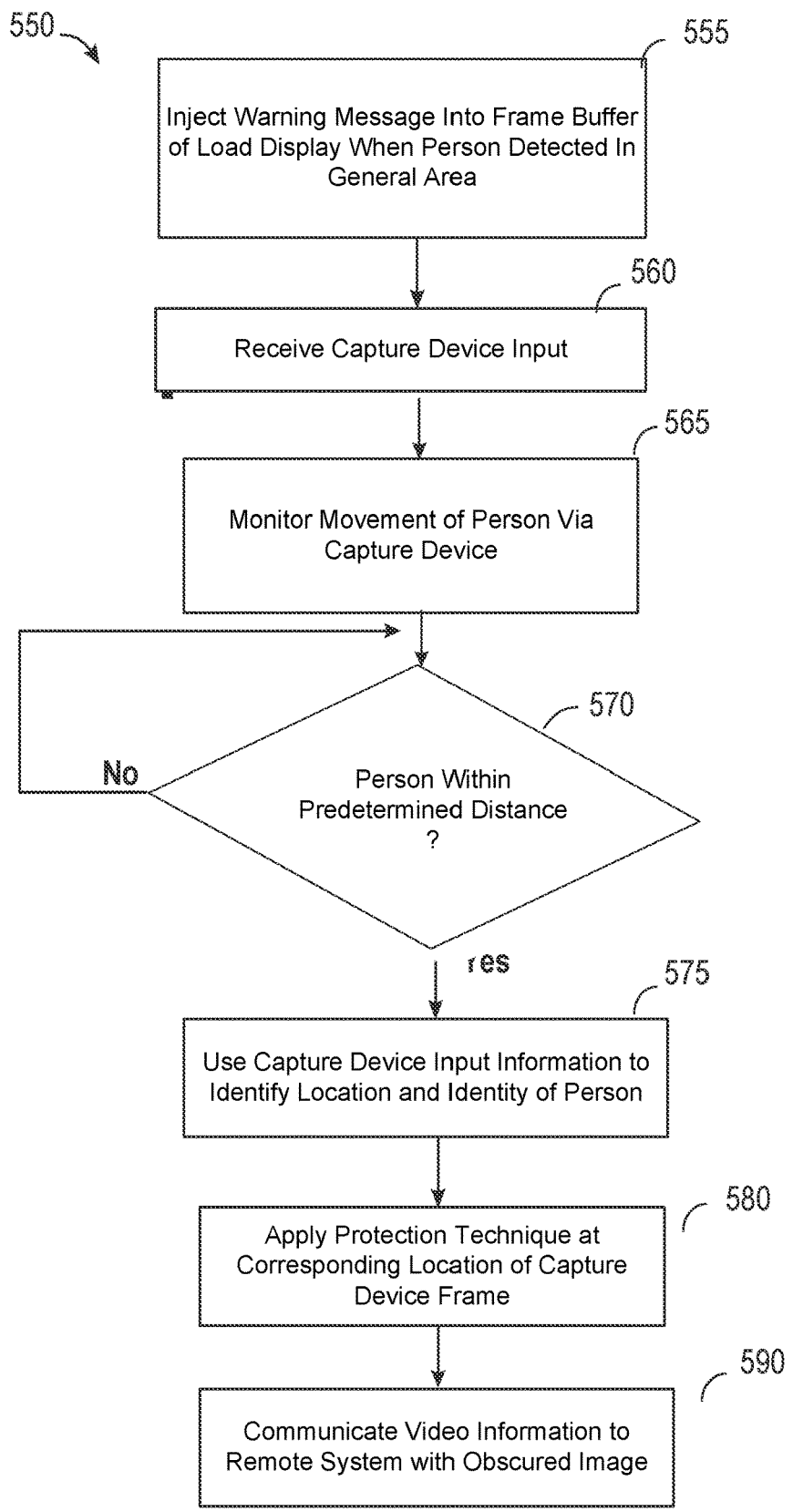
FIG. 6 is a flow diagram of a method for performing a protection technique in accordance with a still further embodiment of the present invention.

Still other forms of intrusion protection can be realized in some embodiments. With reference now to FIG. 6, shown is a flow diagram of a method for performing a protection technique in accordance with a further embodiment of the present invention. Method 550 shown in FIG. 6 may be a further protection technique to be performed by the intrusion protection application during execution when an intruder is identified by the sensor system. As seen, method 550 begins by injecting a warning message into a frame buffer of a local display when a person is detected within the general system area (block 555). In some embodiments, this warning message may be as discussed above.

Still with reference to FIG. 6, the application may receive a capture device input from one or more capture devices, e.g., cameras included in or associated with the system (block 560). Using the information received from such capture device(s), the application may monitor movement of the person (block 565). The information obtained from such movement may include the various information discussed above.

Next it may be determined whether the person is within a predetermined distance of the system, e.g., a proximal detection zone (diamond 570). If so, at block 575 the capture device information may be used to identify the location and identity of the person within the image obtained by the capture device. The capture device information, including a visual indication of the intruder, may be used in applying a protection technique.

More specifically, a protection technique may be to obscure visual information of the intruder from a display frame of a scene captured by the capture device(s). For example, when a user is engaging a video conference or other video communication scheme in which the user and the user's location is being captured and communicated to a remote display, a view of the intruder may be obscured. As described above this obscuration can take different forms, and may include pixellation, blanking or other appropriate measure. Thus the display image for the location includes an obscured image (block 580). And, at block 590, video information can be communicated to a remote system with this obscured image, to prevent viewers of the remote display from seeing the intruder. Although shown with this particular type of protection technique in the embodiment of FIG. 6, understand the scope of the present invention is not limited in this regard, and various other protection techniques may be used separately or in combination with this obscuration technique, if the person is unauthorized.

Figure 7:
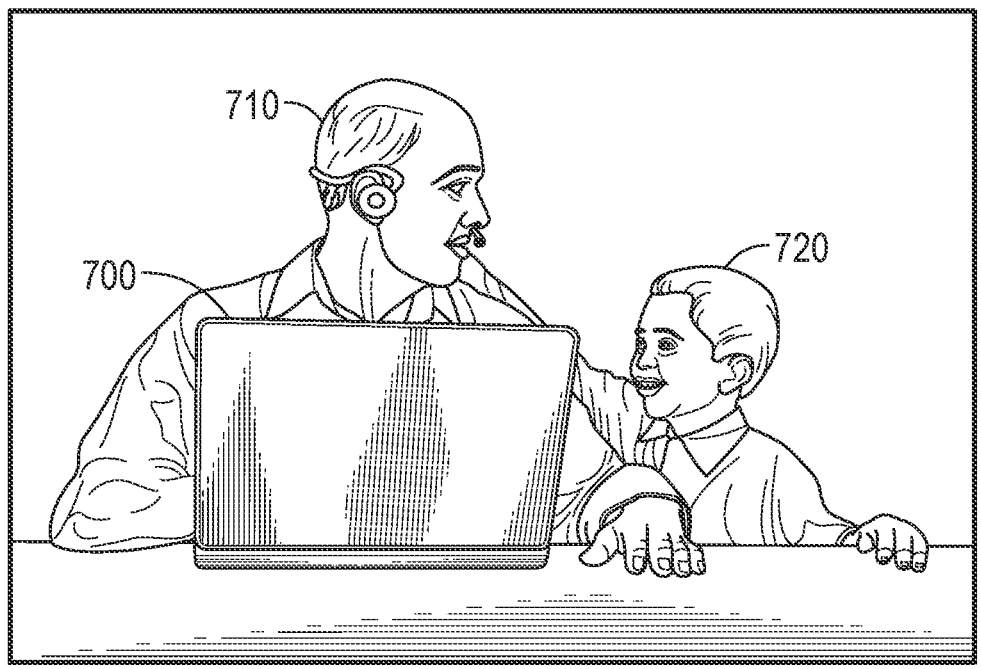
FIG. 7 is an illustration of an intrusion protection scenario in accordance with one embodiment.
Figure 7:

To further illustrate intrusion protection techniques as described herein, several scenarios are shown and described. Referring now to FIG. 7, an example of a first use scenario is described. In this scenario, assume a user 710 is engaging in a video conference via a video conferencing application executing on a system 700 while the user is working from home. When a family member 720 unexpectedly walks in to say hello to the user, the system detects the intrusion, and based on privacy/security settings blurs the image of the family member on the display of the remote system 730.

Figure 8:
FIG. 8 is an illustration of an intrusion protection scenario in accordance with another embodiment.

In another scenario, as illustrated in FIG. 8, users of two geographically distant systems are participating in a video conference and are sharing sensitive/confidential data. On a local system 750 an intrusion detection application, responsive to input from an MUIR or other such sensor, detects a potential eavesdropper and blanks the sensitive information, warns the local user of a potential intruder, and furthermore obscures information on a display of the remote system 760. Note the warning may also be sent to the remote system.

In a still further scenario, assume that an intrusion protection application is configured via security settings of a user to require a pre-warning if someone is approaching the viewable area. When a person enters into a detection zone corresponding to this viewable area, a warning message may be displayed. In this way, a pre-determination of the presence of potential eavesdroppers or unintended participants occurs, which may further enable anticipation of such intruders movements. Although described with these particular example scenarios, understand that embodiments may provide for many other types of intrusion detection, monitoring and protection, and different combinations also can be realized.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Figure 9:
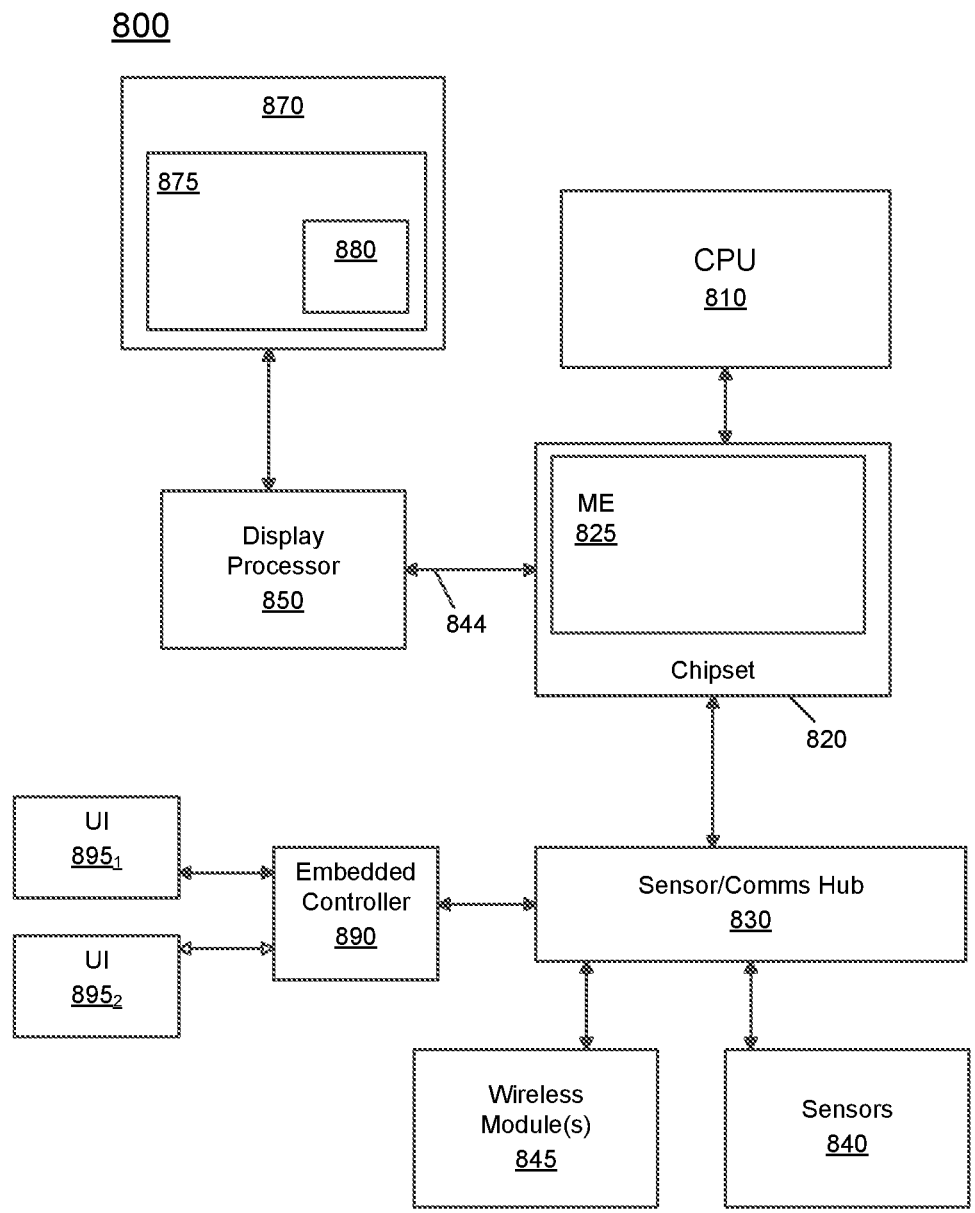
FIG. 9 is a block diagram of a system arrangement in accordance with an embodiment of the present invention

Referring now to FIG. 9, shown is a block diagram of a system arrangement in accordance with an embodiment of the present invention illustrating intrusion protection. As seen in FIG. 9, system 800 may include a CPU 810. In various embodiments, this CPU may be a SoC or other multicore processor and can include secure execution technologies such as Intel® TXT™ technology, Intel® Manageability Engine (ME), or an ARM TrustZone to enable a trusted execution environment. In some embodiments the intrusion detection application may operate in a secure environment.

As seen in the embodiment of FIG. 9, CPU 810 may be coupled to a chipset 820. Although shown as separate components in the embodiment of FIG. 9, understand that in some implementations chipset 820 may be implemented within the same package as CPU 810, particularly when the CPU is implemented as an SoC. Chipset 820 may include a manageability engine 825 which in an embodiment may perform intrusion detection and protection, as described herein.

In the embodiment of FIG. 9, additional components may be present including a sensor/communications hub 830 which may be a standalone hub or configured within chipset 820. As seen, one or more sensors 840 may be in communication with hub 830. For purposes of intrusion detection at least one MUIR sensor and a capture device may be provided. Further illustrative sensors may include a global positioning system (GPS) module or other such dedicated location sensor. Other sensors, such as inertial and environmental sensors may be present. As several examples, an accelerometer and a force detector may be provided and information obtained from these sensors can be used in biometric authentications. Also, in various embodiments one or more wireless communication modules 845 may also be present to enable communication with local or wide area wireless networks such as a given cellular system in accordance with a 3G or 4G/LTE communication protocol.

As further seen in FIG. 9, platform 800 may further include a display processor 850 that can be coupled to chipset 820 via channel 844. As seen, display processor 850 may couple to a display 870 that can be a touch screen display to receive user input such as responses to such requests. Thus in this example, configured within the display may be a touch screen 875 and a touch screen controller 880 (which of course is hidden behind the display itself). Display 870 may be controlled to obscure confidential information when intrusion is detected, and further an image of a detected person can be displayed to enable a user to indicate whether the person is authorized. Other user interfaces, namely user interfaces $895_1$ and $895_2$ which in an example can be a keyboard and a mouse, may be coupled via an embedded controller 890 to the sensor/communications hub 830. Again this input path from these user interfaces may be via an untrusted channel.

Figure 10:
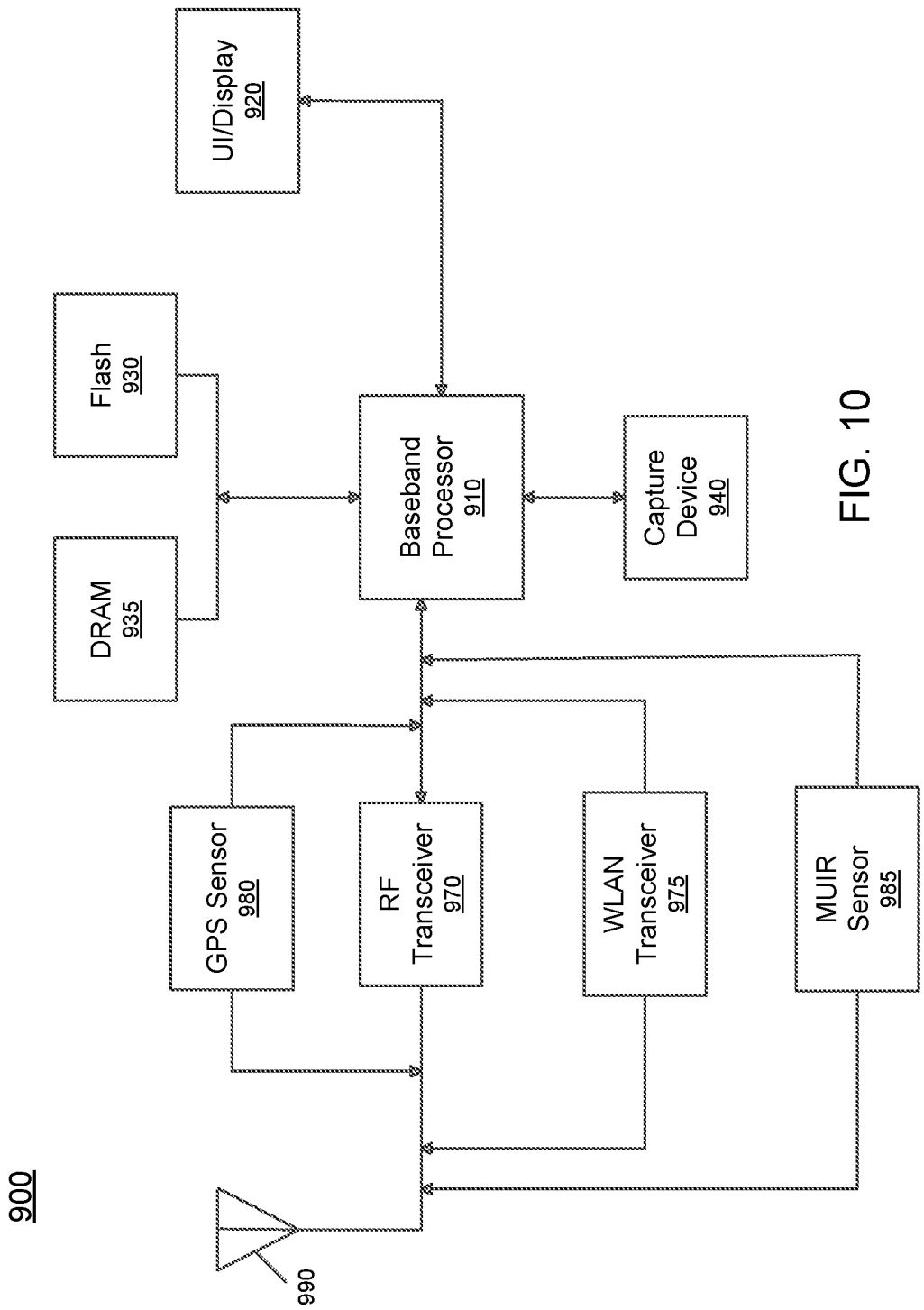
FIG. 10 is a block diagram of an example system with which embodiments can be used.

Embodiments can be used in many different environments. Referring now to FIG. 10, shown is a block diagram of an example system 900 with which embodiments can be used. As seen, system 900 may be a smartphone or other wireless communicator. As shown in the block diagram of FIG. 10, system 900 may include a baseband processor 910 which can execute an intrusion application as described herein. In general, baseband processor 910 can perform various signal processing with regard to communications, as well as perform computing operations for the device. In turn, baseband processor 910 can couple to a user interface/display 920 which can be realized, in some embodiments by a touch screen display that can provide, via a service channel a request for user approval of key pairing operations. In addition, baseband processor 910 may couple to a memory system including, in the embodiment of FIG. 10 a non-volatile memory, namely a flash memory 930 and a system memory, namely a dynamic random access memory (DRAM) 935. As further seen, baseband processor 910 can couple to a capture device 940 such as an image capture device that can record video and/or still images.

To enable communications to be transmitted and received, various circuitry may be coupled between baseband processor 910 and an antenna 990. Specifically, a radio frequency (RF) transceiver 970 and a wireless local area network (WLAN) transceiver 975 may be present. In general, RF transceiver 970 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 980 may be present. Other wireless communications such as receipt or transmission of radio signals, e.g., AM/FM and other signals may also be provided. In addition, via WLAN transceiver 975, local wireless signals, such as according to a Bluetooth™ standard or an IEEE 802.11 standard such as IEEE 802.11a/b/g/n can also be realized. And for purposes of intrusion detection, tracking and monitoring, one or more MUIR sensors 985 may further couple to baseband processor 910. Although shown at this high level in the embodiment of FIG. 10, understand the scope of the present invention is not limited in this regard.

Examples can include subject matter such as a method, means for performing acts of the method, at least one machine-readable medium including instructions that, when performed by a machine cause the machine to perform acts of the method, or of an apparatus or system for intrusion detection, monitoring and protection according to embodiments and examples described herein.

Example 1 is a system comprising: a processor including at least one core to execute an application to provide intrusion detection and protection; a radar sensor to detect presence of at least one person within a detection zone about the system and to output a detection notification responsive to the presence detection, the at least one person separate from a user of the system; and a peripheral controller coupled to the radar sensor to receive the detection notification and to provide the detection notification to the application, where the application is to cause a protection measure to be performed responsive to the detection notification. The peripheral controller may optionally be integrated within the processor or as a separate component of the system. Note that the processor can be implemented using various means. In one optional implementation, the processor is a SoC incorporated in a user equipment touch-enabled device.

Example 2 includes the subject matter of Example 1 and where the application is optionally to prevent display of confidential information on a display of the system responsive to the detection notification.

Example 3 may include the subject matter of any of Examples 1 and 2, including or omitting optional elements, and further includes a capture device coupled to the processor to capture video data at a location of the system.

Example 4 may include the subject matter of Example 3, including or omitting optional elements, and further includes a video conference application to execute on the processor, where the application is to obscure a portion of the video data corresponding to the detected at least one person, and where optionally, the video data including the obscured portion is communicated to a remote system.

Example 5 may include the subject matter of Example 4, including or omitting optional elements, and further where the application is to cause the video conference application to display the user against a predetermined background, responsive to the detection notification.

Example 6 may include the subject matter of any one of Examples 1-5, including or omitting optional elements, and further where the application is to cause a warning to be displayed on a display of the system responsive to the detection notification.

Example 7 may include the subject matter of Example 6, including or omitting optional elements, and where the application is to cause display of an image of the at least one person obtained from a capture device in connection with the warning.

Example 8 may include the subject matter of any one of Examples 1-5, including or omitting optional elements, and where the application includes a configuration module to enable the user to configure a size of the detection zone, and optionally a form of a warning message, and to store configuration settings in a policy table.

Example 9 may include the subject matter of Example 8, including or omitting optional elements, and where the application is to access the policy table responsive to the detection notification and to determine whether to cause the protection measure to be performed based on the detection notification and the configuration settings.

Example 10 may include the subject matter of any one of Examples 1-5, including or omitting optional elements, and where the application is to cause display on a display of the system of an indication of a distance and a direction of movement of the at least one person with respect to the system.

Example 11 may include the subject matter of any one of Examples 1-5, including or omitting optional elements, and where the processor comprises a multicore processor further comprising the peripheral controller.

Example 12 may include the subject matter of Example 11, including or omitting optional elements, and further includes a sensor hub coupled to the radar sensor to receive the detection notification, the sensor hub to provide the detection notification to the peripheral controller.

Example 13 is a method for performing intrusion detection, including: receiving, in a processor of a system executing an intrusion monitoring application, an indication of a person moving into a first detection zone of the system;

determining, in the processor, whether the person is located within a predetermined distance of the system; accessing a policy table to determine a selected protection technique to apply, responsive to determining that the person is located within the predetermined distance; and applying the selected protection technique to the system.

Example 14 may include the subject matter of Example 13, including or omitting optional elements, and further includes monitoring detection information from a sensor of the system responsive to the indication, where the sensor comprises a micropower ultrawideband impulse radar sensor.

Example 15 may include the subject matter of Examples 13 or 14, including or omitting optional elements, and further includes: monitoring an eye gaze of the person and optionally obscuring information displayed on a display of the system responsive to detection of the eye gaze towards the system; and optionally monitoring an eye gaze of a user of the system, and optionally blanking a display of the system when the eye gaze is away from the system.

Example 16 may include the subject matter of any one of Examples 13-15, including or omitting optional elements, and further includes determining whether the person is an authorized user and if so, not applying the selected protection technique.

Example 17 may include the subject matter of any one of Examples 13-16, including or omitting optional elements, and further where the selected protection technique includes obscuring information on a display of the system, and reporting an intrusion detection to a user of the system.

Example 18 may include the subject matter of any one of Examples 13-17, including or omitting optional elements, and further where the selected protection technique includes: identifying a location of the person within a second detection zone of the system using information from a capture device of the system; displaying an image of the person on a display of the system to enable the user to identify whether the person is an authorized individual; and applying the protection technique at a corresponding location of a video frame obtained from the capture device using the information to obscure the person if the person is not an authorized individual.

Example 19 may include the subject matter of Example 18, including or omitting optional elements, and further where the selected protection technique includes communicating the video information with an obscured image at the corresponding location of the video frame to a remote system.

Example 20 may include the subject matter of any one of Examples 13-19, including or omitting optional elements, and further where the selected protection technique includes: using information from a capture device to identify a location of the person within a second detection zone of the system; and displaying a warning on a display of the system in connection with displaying an image of the person obtained from the capture device.

Example 21 may include the subject matter of any one of Examples 13-20, including or omitting optional elements, and further where the selected protection technique includes causing communication of an image of the user to a remote system on a generic background so that the person within the first detection zone is not displayed on the remote system.

Example 22 is an apparatus comprising means to perform a method as in any one of Examples 13 to 21.

Example 23 is at least one machine-readable storage medium comprising machine-readable instructions, when executed, to implement a method as in any one of Examples 13 to 21.

Example 24 is an apparatus comprising: means for associating an intrusion detection application with a first application; means for enabling a user to configure a set of parameters for the intrusion detection application; means for storing the set of parameters in a policy table of the system; means for accessing the policy table to determine a protection technique to apply, responsive to receipt of an indication that a person is detected within a detection zone of the system during execution of the first application; and means for applying the protection technique, during execution of the first application.

Example 25 is an apparatus including the subject matter of Example 24, including or omitting optional elements, and further including means for detecting the person within the detection zone and communicating the information to the means for accessing.

Understand that various combinations of the above examples are possible.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system comprising:
   a processor including at least one core to execute an application to provide intrusion detection and protection;
   a sensor to detect presence of at least one person within a detection zone about the system and to output a detection notification responsive to the presence detection, the at least one person separate from a user of the system;
   a controller coupled to the sensor to receive the detection notification and to provide the detection notification to the application, wherein the application is to cause a protection measure to be performed responsive to the detection notification;
   at least one wireless circuit to enable short-range wireless communication;
   a GPS sensor;
   a near field communication circuit to enable near field communication with another device; and a display to display information, wherein in response to the detection notification, the display is to display an image of the at least one person, and to obscure sensitive information.

2. The system of claim 1, wherein the sensor comprises a capture device.

3. The system of claim 2, wherein the capture device comprises a video capture device.

4. The system of claim 2, wherein the capture device comprises a camera.

5. The system of claim 2, wherein the capture device is to capture the image of the at least one person.

6. The system of claim 1, wherein the sensor is to monitor for eye gaze of the at least one person.

7. The system of claim 1, wherein the at least one wireless circuit is further to enable wireless local area network wireless communication.

8. The system of claim 7, wherein the at least one wireless circuit is further to enable wireless wide area network communication.

9. The system of claim 1, wherein the display comprises a touch screen display.

10. The system of claim 1, wherein the system is to receive wireless power transfer via the near field communication circuit.

11. The system of claim 1, further comprising a microphone to receive voice input, the processor to control one or more operations of the system based at least in part on the voice input.

12. The system of claim 1, wherein the display is to highlight at least a portion of the at least one person.

13. The system of claim 1, wherein the protection measure comprises the display of the image of the at least one person.

14. A mobile phone comprising:
a processor including at least one core to execute an application to provide intrusion detection and protection;
a sensor to detect presence of at least one person within a detection zone about the mobile phone and to output a detection notification responsive to the presence detection, the at least one person separate from a user of the mobile phone;
a controller coupled to the sensor to receive the detection notification and to provide the detection notification to the application;
at least one wireless circuit to enable short-range wireless communication;
a GPS sensor;
a near field communication circuit to enable near field communication with another device; and
a display to display information including sensitive information, wherein in response to the detection notification, the application is to cause the display to obscure the sensitive information, and to cause the display to display an image of the at least one person.

15. The mobile phone of claim 14, wherein in response to the detection notification, the display is to highlight at least a portion of the at least one person.

16. The mobile phone of claim 14, wherein:
in response to a first detection notification when the at least one person enters a first detection zone about the mobile phone, the display is to display an alert comprising a warning message; and
in response to a second detection notification when the at least one person enters a second detection zone about the mobile phone, the display is to display the image of the at least one person.

17. The mobile phone of claim 14, wherein the display comprises a touchscreen.

18. The mobile phone of claim 14, wherein the mobile phone is to communicate video information to a remote system, and in response to the detection notification, the mobile phone is to communicate the video information with an obscured image of the at least one person.

* * * * *